May 14, 1963 N. CHERUP 3,089,144
IMPACT ABSORBERS

Filed Nov. 12, 1958 3 Sheets-Sheet 1

INVENTOR.
NICHOLAS CHERUP
BY
ATTORNEY

May 14, 1963 — N. CHERUP — 3,089,144
IMPACT ABSORBERS
Filed Nov. 12, 1958 — 3 Sheets-Sheet 2

INVENTOR.
NICHOLAS CHERUP
BY
ATTORNEY

May 14, 1963  N. CHERUP  3,089,144
IMPACT ABSORBERS

Filed Nov. 12, 1958  3 Sheets-Sheet 3

INVENTOR.
NICHOLAS CHERUP
BY Melvin Nord
ATTORNEY

# United States Patent Office 3,089,144
Patented May 14, 1963

3,089,144
IMPACT ABSORBERS
Nicholas Cherup, 24215 Hill St., Center Line, Mich.
Filed Nov. 12, 1958, Ser. No. 775,671
5 Claims. (Cl. 2—3)

This invention relates to protective devices, such as safety helmets and the like, which are adapted to protect objects, such as a person's head, from injury due to impact. It may be used in conjunction with sports—as in the case for example of football, baseball, hockey, or polo helmets—in war helmets, in flyers' helmets, in policemen's or firemen's helmets, in construction workers' helmets, or, in general, in any way as a device for protecting an object from impact.

*Prior Art*

The present invention constitutes an improvement over my prior application Serial No. 681,694, filed September 3, 1957, now abandoned. It also constitutes an adaptation and improvement of my prior co-pending patent application in Impact Absorber, Serial No. 657,191, filed May 6, 1957, now Patent No. 2,934,766. In the latter application, I have described a device for the absorption of impact by the stretching of an elastic membrane which in whole or in part covers the object to be protected, and is itself protected by an outer, relatively rigid shield. The impact is first imparted by the external force to said outer rigid shield which, in turn, by forward motion transmits the resulting force to an inner elastic membrane in whole or in part covering the object to be protected, causing the elastic membrane to be stretched in a reverse direction absorbing much of the impact energy, and finally transmitting the residual force to the protected object diminished in total magnitude and distributed as a relatively low pressure over a broad area of said object. Said prior invention is, for example, useful for protection from impact of various parts of the body, such as ribs, thighs, tibia, hands, wrists, or forearms.

In the present invention, I have found a method for adapting and improving my prior invention for additional uses, including use in a safety helmet, in which impact forces are to be guarded against from a much wider variety of directions. In the present improved device, forces from any direction may be absorbed by the stretching of one or more inner elastic cradle straps resting on the head, by the downward motion of an outer, relatively rigid shield, in a manner somewhat similar to that described in my prior invention; in addition, horzontal forces are also absorbed by the rigid outer shield, operating in conjunction with an elastic headband, by a modification of the principle described in said prior inventon. In the present invention, a rigid shield completely circumscribes the object to be protected (for example, a person's head) in any horizontal plane, and protects it from impact forces not only from one side, but from any direction.

The devices disclosed herein may also be regarded as improvements over Riddell's protective shield support (U.S. 2,250,275). Riddell discloses athletic protective equipment of various types, including a helmet containing structural features which are for the most part the same as I use in my present helmet. The improvements disclosed herein are derived in part from (1) the application of the method of impact absorption disclosed in my prior co-pending application (involving the substitution of elastic materials for inelastic materials in the inner members), (2) an additional related improvement, relating to the mechanical characteristics of the elastic materials employed. The use of elastic inner membranes as in my invention, converts Riddell's protective shield from his static force-distributor into my improved dynamic impact absorber.

It is recognized that the basic idea of using elastic materials in the cradle straps of a helmet is not broadly new. Clark (U.S. 2,297,874) mentioned the use of elastic cradle straps in a helmet; his invention related to the outer rigid shell, however. Gross (U.S. 2,758,305) also mentioned the use of cradle straps "of elastic or resilient material" in a helmet. However, Gross's patent states the disadvantages inherent in the use of such materials, and his invention consisted of using metal coils which would fail inelastically at the maximum allowable load.

According to Gross, the disadvantage of using elastic cradle straps in helmets would be that they cannot absorb enough impact energy to prevent injury, without permitting so much downward motion of the outer rigid shield as to cause bearing contact with the head. The reason for this is largely the substantially linear stress-strain curve of ordinary "elastic" materials. If the available clearance between the outer shield A and the inner cradle strap B is $x_0$, as indicated in FIG. 8, and the maximum force in the strap B which can be sustained without exceeding the fracturing stress of the wearer's skull or neck is $F_0$, optimum conditions would require that these be attained simultaneously, in order to maximize the amount of impact energy which can be absorbed without damage to the wearer. As shown in FIG. 9, if the stress-strain curve is of this type (shown as "a"), the maximum impact energy (represented by the shaded area under line "a") can be absorbed. A "steeper" line (shown as "b") will obviously absorb less energy, and so will a "flatter" line (shown as "c"), because the areas beneath them will be smaller. The maximum impact energy which can be absorbed by straps having a linear stress-strain curve is thus $$\frac{F_0 x_0}{2}$$

if the design is perfect (that is to say if the slope of the force-distance curve is equal to $F_0/x_0$). If the external impact energy exceeds this value, the wearer will be injured.

As shown by Gross and, as indicated in FIG. 10, if the cradle straps B have, interposed somewhere along their length, spring coils having a high spring constant, but which yield inelastically at an applied force less than $F_0$, a very substantial increase in absorbable impact energy may result. That is the basic principle of Gross's invention.

Although both Clark and Gross have thus referred, in passing, to the use in helmets of cradle straps having elastic properties, such straps have never actually been used commercially, so far as I am aware. The reason for this seems to be attributable basically to disadvantages of the type discussed by Gross—namely it does not appear to be feasible to absorb sufficient impact energy to protect the wearer fully. If elastomeric materials are employed, having substantially linear stress-strain curves, they are found to be very limited in the amount of impact energy they can absorb at small displacement. In fact, they are generally disadvantageous even as force-distributors—to say nothing of their inability to absorb sufficient impact energy—because of the tendency to cause the rigid shield to come into bearing contact with the head of the wearer at relatively low force loads. Metal coil springs having proper spring constants could be incorporated in the straps, in order to avoid this. There are however, practical disadvantages, from the safety standpoint, to the use of metals in helmets. Furthermore, if one were to utilize Gross's coil springs, which are characterized by inelastic yielding, one would lose much of the advantages inherent in elastic members—namely that they are re-usable, since elastic deformation is reversible. If the helmet is to be used, for example, in athletic contests, it is obvious that such repetitiveness is vital.

Thus, present helmets and similar protective equipment suffer from the disadvantage of either having no impact absorption power, or of having an insufficient impact absorption power, or of being incapable of repeated absorption of large impacts. The present invention provides a solution to this problem.

Objects of the Invention

An object of the present invention is to provide an improved impact absorber in which an elastic membrane bears against the object to be protected, being itself supported by an outer elastic membrane which is under tension and is fastened at a plurality of points to an outermost relatively rigid enveloping shield.

A second object of the present invention is to provide an improved impact absorber, in which an elastic membrane circumscribes the object to be protected, being itself supported, by fastening thereto at a plurality of points, by a circumscribing polygonal elastic membrane which is under tension and is fastened at a plurality of points to an outermost relatively rigid circumscribing shield.

A third object of the present invention is to provide a safety helmet for absorbing impact from above or from any direction and distributing it, greatly diminished in magnitude, over a large area of the head, without the need for padding.

A fourth object of the present invention is to provide a safety helmet in which one or more elastic members bear against the head, being themselves protected by an outer, relatively rigid shield which, upon receiving an impact, moves forward, thereby transmitting the resulting force to said elastic members, causing them to be stretched in a reverse direction absorbing much of the impact energy, and finally transmitting the residual force to the head greatly diminished in magnitude and distributed as a relatively low pressure over a broad area of the head, thus minimizing the possibility of serious injury.

A fifth object of the present invention is to provide an improved impact absorber in which an elastic member is used to absorb impact energy by reverse stretching, said elastic member comprising a tightly woven elasticized fabric characterized by having a convex stress-strain curve, thereby permitting repetitive absorption of increased amounts of impact energy.

Advantages of the Invention

An advantage of the present invention is that it provides extremely effective repetitive absorption of impact from any direction.

A second advantage of the present invention is that it provides effective repetitive absorption of impact without the need for padding.

A third advantage of the present invention is that it provides effective repetitive absorption of impact, coupled with distribution of residual force at a low unit pressure against the object to be protected.

A fourth advantage of the present invention is that it provides effective repetitive absorption of impact and distribution of residual force at a low unit pressure over a broad area of the object to be protected, by means of elastic members which are themselves protected against direct impact by an outer relatively rigid shield.

A fifth advantage of my invention is that a safety helmet or other protective device incorporating these features is much lighter, much less bulky, and much more effective than similar devices containing the conventional padding.

Other objects and advantages of my invention will more fully appear from the description taken in connection with the accompanying drawings, wherein are disclosed preferred embodiments of my invention.

Drawings

Similar numerals represent similar parts in each figure.

Description of the Invention

The figures show a preferred embodiment of the invention, as applied to a football helmet.

Figure 1:
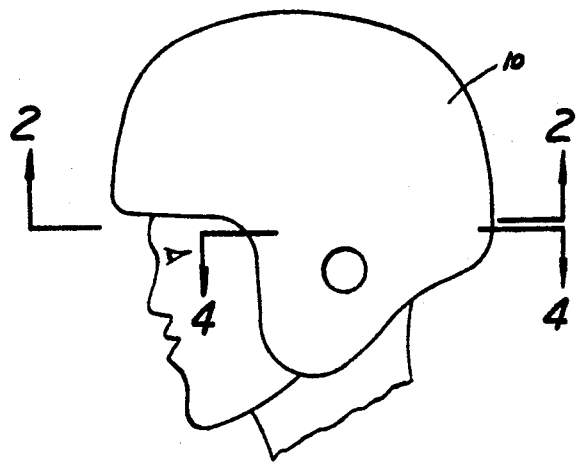
FIG. 1 is a general view of a preferred embodiment of my invention, comprising a safety helmet the type used by football players.
Figure 2:
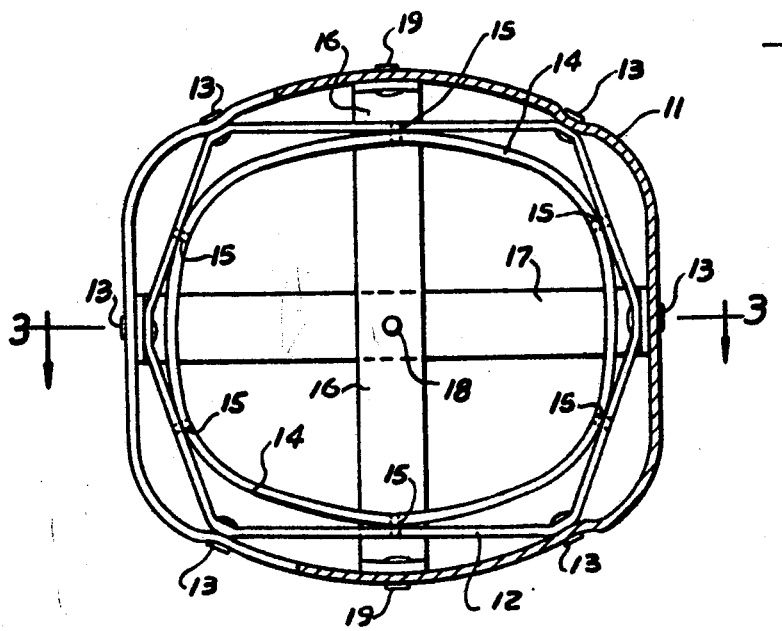
FIG. 2 is a horizontal cross-sectional view, taken along the lines 2—2 of FIG. 1.
Figure 3:
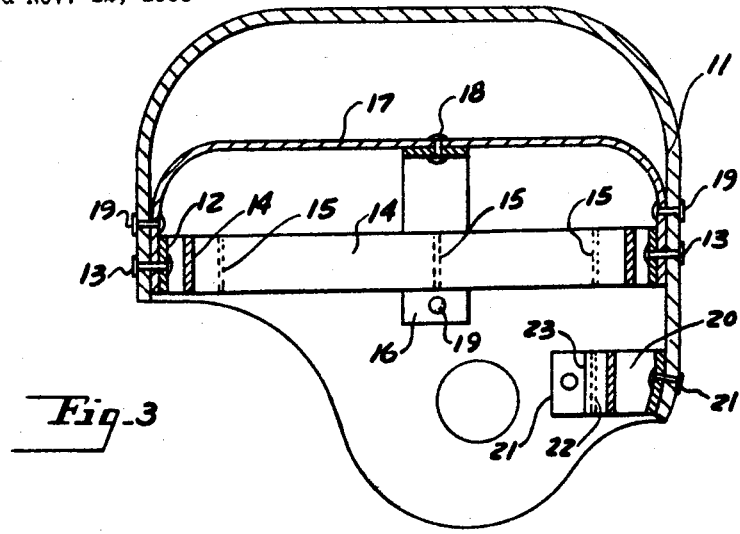
FIG. 3 is a vertical cross-sectional view, taken along the lines 3—3 of FIG. 2.

FIG. 1 shows the helmet 10 generally. As shown in FIGS. 2 and 3, a relatively rigid outer shield 11 of conventional type covers the head of the player from direct impact, and is of conventional shape.

In order to protect the head from impacts from above, I have applied the general principle disclosed in my prior application Ser. No. 657,191, filed May 6, 1957. Thus, I have provided two elastic cradle straps 16, 17, which rest upon the top of the head, and pass down around it to forehead level, being fastened together above the head at right angles to each other at point 18, and being individually fastened to the outer shield 11 at forehead level by suitable fasteners 19. Thus, if an external force is suddenly applied from above, the force is first transmitted to the outer relatively rigid shield 11, which will therefore tend to move downwardly. However, the downward motion of the shield 11 is retarded by the elastic cradle straps 16, 17, which are fastened to the shield 11 and extend over the head. Thus, the elastic straps 16, 17 will stretch in a reverse direction. This stretching causes increased tension in the elastic straps 16, 17, thereby retarding further downward motion of the shield 11. The force is thus distributed over the surface of the elastic straps 16, 17, which undergo reverse stretching, and absorb much of the impact energy, and which ultimately distribute the residual force over a relatively broad area of the head.

Figure 5:
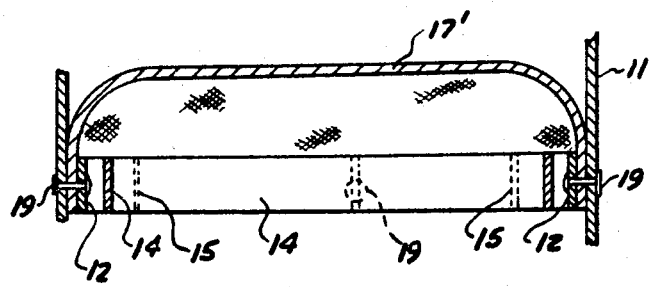
FIG. 5 shows a modified form of the invention.

While I have shown two straps 16, 17, I may in fact use any number of straps. If I use more straps, they will in general be decreased in width. On the other hand, I may, if desired, use a single membrane which will, in this case be substantially in the shape of an elastic cap or liner. This is shown in FIG. 5, which is a view similar to that shown in FIG. 3, except that there is a single elastic cap or liner 17' extending around the head, instead of two elastic straps 16, 17.

Returning now to FIGS. 2 and 3—particularly FIG. 2—I have shown an adaptation of my original principle, for use in absorbing horizontal impact blows (or blows containing a horizontal component). For this purpose, I have provided a substantially polygonal horizontal elastic headband 12 (in the drawing shown as hexagonal), fastened to the outer shield 11 by fasteners 13 at about forehead height. The segments of said polygonal band 12 between fastening points are shown as substantially straight lines, the band 12 being under tension. Inscribed within said polygonal band 12 is an ovoid elastic band 14, fastened to the polygonal band 12 at points 15, as by stitching, for example. Although I prefer to maintain elastic band 14 also under some tension, I have shown this band as conforming substantially to the shape of the head at about forehead level, i.e. ovoid, as it is when the helmet is being worn. The polygonal band 12 acts primarily as a support for the ovoid band 14, the latter being the one which absorbs most of the impact, and being the one which distributes the residual force to the head decreased in magnitude, and dispersed over a relatively broad area.

It will be observed that the general principle upon which ovoid band 14 operates is similar to that described in my prior patent application (and as exemplified also in the present patent by elastic straps 16, 17 or elastic liner 17')—namely, reversed stretching of an elastic membrane which absorbs impact energy and distributes the residual force over a broad area of the object to be protected. However, it differs from the previous invention in that it is not necessary to fasten said band 14 to the outer rigid shield 11, the polygonal band 12 obviating this requirement. And since it is not necessary to fasten said band 14 to the outer shield 11, it is now possible to provide an impact absorber of the reverse-stretching type which completely encircles the object to be protected, and provides protection from impact around a full 350 degrees, instead of only about 180 degrees.

Figure 7:
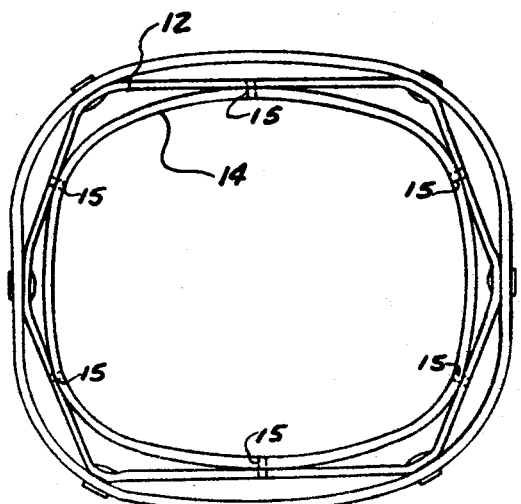
FIG. 7 shows a third modified form of the invention.

It is clear that this all-directional impact absorption technique can be used in applications other than in helmets or other headgear, without the use of additional elastic straps 16, 17, where the forces are all in a single plane (or in a set of parallel planes). This is shown in FIG. 7, which is similar to FIG. 2, except that there are no elastic cradle straps 16, 17.

Figure 4:
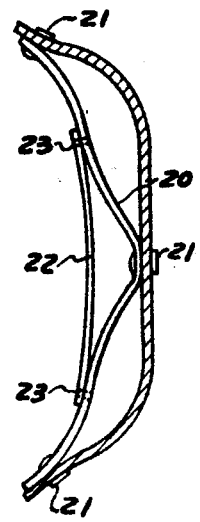
FIG. 4 is a horizontal cross-sectional view, taken along the lines 4—4 of FIG. 1.

Returning now to the football helmet, I may also use an additional impact absorber therein, at the rear of the head, at a level below that of the forehead. This is shown in FIG. 4, where I have shown an elastic membrane 22, bearing against the back of the head supported by fastening (e.g. by stitching) at points 23, 23 by an elastic band 20 maintained under tension, said elastic band 20 being itself fastened at three points 21 to the outer shield 11. It will be seen that this is similar to the all-directional impact absorber illustrated in FIG. 7, except that it protects only the rear of the object being protected (in this case, the back of the head), instead of circumscribing and protecting the entire object from blows from any direction.

Figure 6:
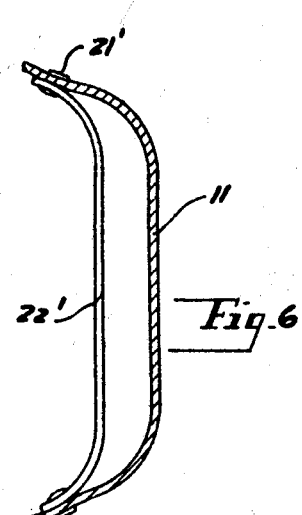
FIG. 6 shows a second modified form of the invention.
Figure 8:
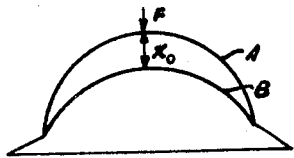
FIG. 8 is a schematic diagram of a helmet, showing the relationship of applied force to distance between the outer and inner members.
Figure 9:
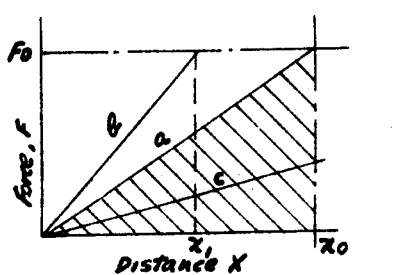
FIG. 9 shows diagrammatically various force-distance curves for conventional elastic, i.e. linear materials.
Figure 10:
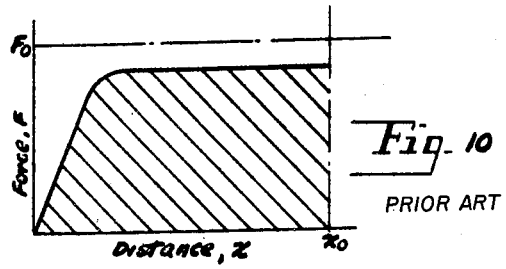
FIG. 10 shows diagrammatically a force-distance curve of the type resulting when coil springs are interposed in the inner member of an impact absorber, such as employed in the prior art.

Alternatively, as shown in FIG. 6, I may use, for this part of the helmet, an impact absorber of the type described in my prior patent application, comprising an elastic membrane 22' attached at points 21', 21' to the shield 11.

It is clear that the impact absorber shown in FIG. 4 may be used individually in other applications, as an alternative to the impact absorber described in my prior patent application, the relation between the two being readily apparent by comparison of FIGS. 4 and 6.

It is contemplated, in all embodiments of the present invention that each of the aforesaid "elastic" members will comprise an elasticized woven fabric, that is an elasticized woven fabric, containing both elastomeric and non-elastomeric threads or cords. It is also contemplated that any or all of said "elastic" members may comprise a special type of elasticized woven fabric, characterized by a convex stress-strain curve.

Elasticized woven fabrics do not behave mechanically like ordinary materials; they are actually composite structures, with relatively complex stress-strain curves.

Figure 11:
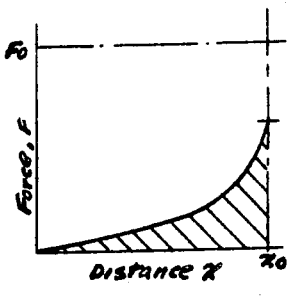
FIG. 11 shows diagrammatically a force-distance curve of the type resulting when conventional elasticized woven fabrics are employed as the inner member of an impact absorber.

The mechanical behavior of an ordinary elasticized woven fabric is shown in FIG. 11. At relatively low loads, the fabric behaves very much as if it consisted of rubber alone, having an approximately linear stress-strain curve of low slope (i.e. of high extensibility). After the rubber has been stretched somewhat, the stress-strain curve becomes highly concave in shape, apparently because of the fact that the non-rubber threads interfere with the further stretching of the rubber threads. The result is very unsatisfactory, insofar as absorption of impact is concerned, as seen by the smallness of the shaded area in FIG. 11. This behavior accounts for the fact that elasticized woven fabrics are not used in helmets, in place of the ordinary non-elastic fabrics.

Figure 12:
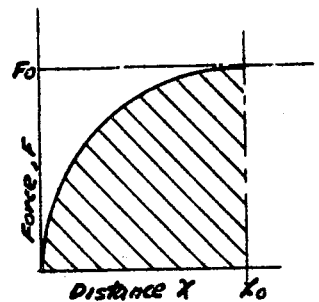
FIGS. 12 and 13 show diagrammatically force-distance curves of the type resulting when a special tightly-woven elasticized fabric is employed, according to the present invention.

However, I have found that it is possible to obtain tightly woven elasticized fabrics having highly convex stress-strain curves, such as that shown in FIG. 12. That is to say, they have highly convex stress-strain curves up to roughly half their maximum possible stretch. Beyond that point, they become concave, like ordinary elasticized woven fabrics; that is to say, the stress-strain curve is like that shown in FIG. 13.

It should be kept in mind that, despite the fact that the stress-strain curves of elasticized woven fabrics are not linear, the stretch is nevertheless reversible. There may be a small hysteresis loop on reversal, but there is no perceptible permanent stretch. The combination of this reversibility of stretch and the convex stress-strain curve characteristic of tightly-woven elasticized fabrics makes them absolutely unique among all materials, insofar as I am aware, and makes them the ideal material for use in impact absorbers, particularly in helmets, where it is crucial to have maximum absorption of impact without excessive stretch.

So far as I am aware, the use of such materials in impact absorbers is completely unknown among persons skilled in the art. In fact, so far as I am aware, even the existence of such materials (or rather, of their unusual characteristics) is unknown to persons skilled in the art. The mechanical properties of such materials are not available in the ordinary places, such as engineering handbooks. In fact, even apart from the reversibility characteristic, stress-strain curves of the type shown in FIG. 13, characteristic of these materials, appear to be unknown for any other type of materials, and their existence does not even appear to be suspected. It is by no means clear why they have such unusual stress-strain curves. It is hard to understand, even after their existence has been established, why they behave that way. Apparently there is some initial resistance to overcome before the rubber threads can begin to stretch, but what this resistance is, why it isn't present in ordinary elasticized woven fabrics, why it disappears after a certain force has been applied, and how it can become re-established after the load has been entirely removed, are all puzzles. Nevertheless, such fabrics exist, and are made by conventional means differing only in degree from the usual methods of making elasticized woven fabrics. For example, a type suitable for use in the straps of a helmet was obtained from the United Elastic Corp., of Easthampton, Mass. It is described by them as 1–1336, 3" white with natural back woven elastic of cotton and nylon, containing a warp yarn of cotton, filling of nylon, and natural rubber strands. A three-inch wide strap, 11 inches long, had the following force-deflection characteristics:

| Force (lbs.): | Stretch (inches) |
|---|---|
| 5 | .05 |
| 10 | .08 |
| 15 | .10 |
| 20 | .12 |
| 25 | .17 |
| 30 | .23 |
| 35 | .49 |
| 40 | 1.00 |
| 45 | 1.79 |
| 50 | 2.52 |
| 55 | 3.23 |
| 60 | 3.93 |
| 65 | 4.45 |
| 70 | 4.67 |
| 75 | 4.97 |
| 80 | 5.18 |
| 85 | 5.38 |

Release of the load resulted in no perceptible permanent stretch. The manufacturer indicates that the rubber strands were kept under tension at all times during the manufacture, as is conventional in the manufacture of elasticized woven fabrics.

Figure 13:
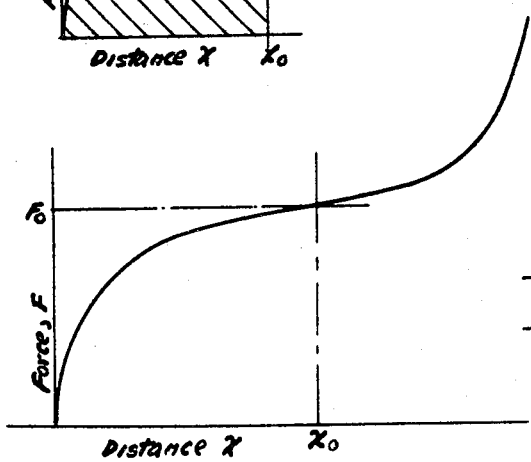

I have found that the use of tightly-woven elasticized fabrics characterized by convex-concave tensile force-elongation curves such as that shown in FIG. 13, makes possible the construction of extremely effective impact absorbers, provided the design is such that substantially only the convex portion of the curve is effective in use, up to the time the outer and inner members of the device come into contact with each other.

Thus, I have constructed a helmet of the type described above, utilizing cradle straps consisting of such tightly-woven elasticized fabric, and it has been used in football games with very satisfactory results. As a test, a two-hundred pound player running at full speed intentionally batted his head against a concrete wall, with no injury. A rib protector, of the type shown in FIG. 6, was also prepared. A player with a broken rib was able to play 60 full minutes of football with this protector. Such results are simply not attainable in any other way presently known.

Thus, in FIGS. 1, 2, 3, and 4, I have described a preferred embodiment of the present invention, comprising a football helmet. In FIG. 5, I have shown a modification thereof, utilizing an elastic cap or liner 17', instead of a plurality of elastic straps 16, 17 as in FIG. 3. In FIG. 6, I have shown another modification utilizing, for protection of the back of the head, the invention disclosed in my prior application, instead of the structure shown in FIG. 4.

In addition, in FIG. 7, I have shown an embodiment of my invention, as applied in general in the protection of any object from impact blows which are all substantially in a single plane or set of parallel planes. This is applied in FIG. 2 for helmets, but may be used in any other application where all directional planar protection is required. Furthermore, I have pointed out, in connection with FIG. 4, how this all-directional planar impact absorber may be modified for use where protection over less than 360 degrees is sufficient.

Other modifications in the details of construction may also be made without departing from the spirit of my invention, the principal novel features of which are set forth below.

Having now described my invention fully, I claim:

1. An impact absorber capable of repeatedly absorbing external impacts, comprising. (1) an inner resilient membrane adapted to envelope and bear against at least the rear convexly curved portion of an object to be protected and be thereby maintained under tension; and (2) an unyielding outer shield enveloping said inner resilient membrane and being fastened thereto by suitable fastening means at the forward portion thereof and being spaced apart therefrom elsewhere, and adapted to receive and distribute the force of a blow over the surface of the object in contact with said resilient membrane; wherein said resilient membrane comprises a tightly-woven elasticized fabric comprising interwoven substantially inelastic fibers and highly elastic and substantially reversibly stretchable fibers, and characterized by having a convex-concave tensile force-elongation curve, substantially only the convex portion thereof being effective at elongations up to that causing bearing contact of said outer shield and the object to be protected.

2. An impact absorber capable of repeatedly absorbing external impacts comprising: (1) an inner resilient membrane adapted to bear against at least the rear convexly curved portion of an object to be protected and be thereby maintained under tension; (2) an unyielding outer shield enveloping said inner resilient membrane and the object to be protected, and spaced apart therefrom; and (3) an intermediate resilient member enveloping said inner resilient membrane and the object to be protected, said intermediate resilient member comprising a plurality of chordal straps stretched across successive arcuate regions of said outer shield and anchored thereto and arranged in angular relation to each other in substantially the same plane; wherein said inner resilient membrane is fastened to said intermediate resilient member at points intermediate the aforesaid points of anchoring of said intermediate resilient member and said outer shield, and is spaced apart therefrom elsewhere, whereby said inner and intermediate resilient members will cooperate to receive and distribute the force of a blow over the surface of the object in contact therewith and to absorb reversibly a substantial portion of th external impact; and wherein at least one of said resilient members comprises a tightly-woven elasticized fabric comprising interwoven substantially inelastic fibers and highly elastic and substantially reversible stretchable fibers, and characterized by having a convex-concave tensile force-elongation curve, substantially only the convex portion thereof being effective at elongations up to that causing bearing contact of said outer shield and the object to be protected.

3. An impact absorber, as set forth in claim 2, wherein: (1) said inner resilient membrane forms a closed band adapted to flex about the convex surface of an object to be protected; (2) said intermediate resilient member circumscribes said inner resilient membrane; and (3) said outer shield circumscribes said inner resilient membrane.

4. A protective helmet capable of repeatedly absorbing external impacts comprising: (1) an unyielding outer shield adapted to cover the head of the wearer; (2) an inner resilient membrane adapted to fit over the head of the wearer and to extend downwardly around it, being fastened to said outer shield at its lower end and spaced apart therefrom elsewhere; (3) a resilient headband adapted to flex about the forehead of the wearer, circumscribed by said outer shield and spaced inwardly therefrom; and (4) a plurality of resilient chordal straps stretched across successive arcuate regions of said outer shield and anchored thereto and arranged in angular relation to each other in the plane of said headband; wherein said resilient headband is fastened to said resilient chordal straps at points intermediate the points of anchoring of said chordal straps and said outer shield, and is spaced apart therefrom elsewhere, whereby said resilient headband and chordal straps will cooperate to receive and distribute the force of a blow over the surface of the head, and to absorb reversibly a substantial portion of the external impact; and wherein at least one of the aforesaid resilient members comprises a tightly woven elasticized fabric comprising interwoven substantially inelastic fibers and highly elastic and substantially reversibly stretchable fibers, and characterized by having a convex-concave tensile force-elongation curve, substantially only the convex portion thereof being effective at elongations up to that causing bearing contact of said outer shield and the object to be protected.

5. A protective helmet capable of repeatedly absorbing external impacts comprising: (1) an unyielding outer shield adapted to cover the head of the wearer; (2) a plurality of radiating resilient cradle straps secured to each other at the top and fastened to said shield at their lower ends, to form a crown-like cradle to space the wearer's head from the top of said shield; (3) a resilient headband adapted to flex about the forehead of the wearer, circumscribed by said outer shield and spaced inwardly therefrom; and (4) a plurality of resilient chordal straps stretched across successive arcuate regions of said outer shield and anchored thereto and arranged in angular relation to each other in the plane of said headband; wherein said resilient headband is fastened to said resilient chordal straps at points intermediate the points of anchoring of said chordal straps and said outer shield, and is spaced apart therefrom elsewhere, whereby said resilient headband and chordal straps will cooperate to receive and distribute the force of a blow over the surface of the head, and to absorb reversibly a substantial portion of the external impact; and wherein at least one of the aforesaid resilient members comprises a tightly-woven elasticized fabric comprising interwoven substantially inelastic fibers and highly elastic and substantially reversibly stretchable fibers, and characterized by having a convex-concave tensile force-elongated curve, substantially only the convex portion thereof being effective at elongations up to that causing bearing contact of said outer shield and the object to be protected.

References Cited in the file of this patent
UNITED STATES PATENTS

| | | |
|---|---|---|
| 1,839,657 | Duchek | Jan. 5, 1932 |
| 2,250,275 | Riddell | July 22, 1941 |
| 2,758,305 | Gross | Aug. 14, 1956 |
| 2,796,609 | Fisher et al. | June 25, 1957 |
| 2,879,513 | Hornickel et al. | Mar. 31, 1959 |
| 2,910,702 | Austin et al. | Nov. 3, 1959 |
| 2,921,318 | Voss et al. | Jan. 19, 1960 |